US008683459B2

(12) United States Patent
Gebhart et al.

(10) Patent No.: US 8,683,459 B2
(45) Date of Patent: Mar. 25, 2014

(54) AUTOMATED VIRTUAL APPLIANCE SIZING

(75) Inventors: Alexander Gebhart, Akazienweg (DE);
Erol Bozak, Vinzentiusstrasse (DE)

(73) Assignee: SAP AG, Walldorf (DE)

(*) Notice: Subject to any disclaimer, the term of this patent is extended or adjusted under 35 U.S.C. 154(b) by 1472 days.

(21) Appl. No.: 12/037,875

(22) Filed: Feb. 26, 2008

(65) Prior Publication Data

US 2009/0217260 A1 Aug. 27, 2009

(51) Int. Cl.
*G06F 9/44* (2006.01)
*G06F 9/455* (2006.01)

(52) U.S. Cl.
USPC .............................................. 717/172; 718/1

(58) Field of Classification Search
None
See application file for complete search history.

(56) References Cited

U.S. PATENT DOCUMENTS

| | | | | |
|---|---|---|---|---|
| 6,487,547 | B1* | 11/2002 | Ellison et al. | 707/600 |
| 6,816,944 | B2* | 11/2004 | Peng | 711/133 |
| 7,080,357 | B2* | 7/2006 | Foster et al. | 717/126 |
| 7,181,731 | B2* | 2/2007 | Pace et al. | 717/177 |
| 7,315,903 | B1* | 1/2008 | Bowden | 709/250 |
| 7,669,186 | B2* | 2/2010 | Nolan et al. | 717/124 |
| 2002/0059561 | A1* | 5/2002 | Foster et al. | 717/126 |
| 2002/0078209 | A1* | 6/2002 | Peng | 709/227 |
| 2002/0174189 | A1* | 11/2002 | Peng | 709/217 |
| 2003/0051236 | A1* | 3/2003 | Pace et al. | 717/177 |
| 2005/0278278 | A1* | 12/2005 | Petev et al. | 707/1 |
| 2007/0061277 | A1* | 3/2007 | Boden et al. | 707/1 |
| 2007/0073849 | A1* | 3/2007 | Baikov et al. | 709/220 |
| 2007/0113218 | A1* | 5/2007 | Nolan et al. | 717/124 |
| 2008/0201705 | A1* | 8/2008 | Wookey | 717/175 |
| 2009/0098914 | A1* | 4/2009 | Martin-Cocher et al. | 455/572 |

OTHER PUBLICATIONS

Rahman, Mizanur. "MediaWiki Administrators' Tutorial Guide." Copyright 2007 Packt Publishing. pp. 7-17. Retrieved from Safari Books on Dec. 3, 2012.*
Chang et al., "Automatic Configuration and Run-time Adaptation of Distributed Applications", Proceedings of the Ninth International Symposium on High-Performance Distributed Computing, (2000), pp. 1-19.
Krsul et al., "VMPlants: Providing and Managing Virtual Machine Execution Environments for Grid Computing", Proceedings of the 2004 ACM/IEEE conference on Supercomputing (2004), pp. 1-12.
Morajko et al., "MATE: Monitoring, Analysis and Tuning Environment for parallel/distributed applications", Concurrency and Computation: Practice & Experience vol. 19, Issue 11 (Aug. 2007), pp. 1517-1531.

* cited by examiner

*Primary Examiner* — Don Wong
*Assistant Examiner* — Erika Kretzmer
(74) *Attorney, Agent, or Firm* — Mintz Levin Cohn Ferris Glovsky and Popeo, P.C.

(57) ABSTRACT

Methods and apparatus are provided for sizing the operating system of a virtual machine. The computer-implemented method includes receiving information representative of an extended application layer and a container, both of which operate at a virtual machine at a host. A determination is made regarding whether one or more aspects of the extended application and the container may be deinstalled by testing at the virtual appliance preconfigured sets of extended application layers and container infrastructure layers, the testing of preconfigured sets performed in order from a smallest preconfigured set having a smallest number of components to a lamest preconfigured set having a lamest number of components. The extended application and the container are implemented without the deinstalled aspects.

11 Claims, 4 Drawing Sheets

AUTOMATED VIRTUAL APPLIANCE SIZING

FIELD

The present disclosure generally relates to virtual machines and, in particular, to sizing aspects associated with a virtual machine.

BACKGROUND

Computers have now become an integral part of our society both in business and in residential settings. Almost every business of sufficient size in Germany, the United States, and other developed countries has one or more computers to assist them in running their businesses. Similarly, many families in those countries now have computers at home that are used to run various applications including games.

Some attribute the popularity of the computers to the Internet. The Internet provides people with a ready access to vast amounts of data. Many people now get their news, sports, stock, entertainment, and other information primarily from the Internet. Businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Virtualization is a technology for optimizing processing at a computer. Virtualization provides a software layer that when executed allows multiple virtual machines with, in some cases, different operating systems to run side-by-side with other virtual machines running on the same host (e.g., a physical machine, such as a node, a computer, a processor, a server, a blade, and the like). A virtual machine is a machine that is defined and implemented in software rather than hardware. The virtualization software provides a so-called "wrapper" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines to operate as application servers. In both cases, fifty application servers are deployed, but with virtualization, the number of physical servers is reduced to twenty-five. Virtualization software may also control one or more of the following functions: running multiple virtual machines with different operating systems at the same time on the same physical machine; generating fully configured isolated virtual machines with a set of virtual hardware including an operating system and applications; saving, copying, and provisioning of virtual machines; and moving virtual machines from one physical machine to another physical machine for workload management.

An example of virtualization software is a hypervisor (also referred to as a virtual machine controller or, more simply, a controller). VMWare ESX and VMware Server are examples of hypervisor software for virtualizing an operating environment (including operating system, IP (Internet Protocol) addresses, registries, and other aspects normally found in a computer system) to provide a virtual machine. The hypervisor software may control (or manage) the physical machine's processor, memory, and other resources enabling the virtual operating environments (i.e., systems).

The virtual machine may include an operating system. The operating system may include one or more applications. An operating system (OS) is the program that, after being initially loaded into the computer by a boot program, manages other programs on computer. The other programs are called applications (also referred to as application programs). The application may make use of the operating system by making requests for services through one or more application program interfaces (API). An application may perform one or more specific functions (or tasks) directly for a user or, in some cases, another program or application program. Examples of applications include spreadsheets, word processing, browsers, and the like. For example, a virtual machine may include an operating system, such as Linux or Windows Vista, and one or more application programs, such as a browser, all of which operate in the so-called "container" provided by the virtual machine. In some cases, the virtual machine may also include some data for use by the application.

The phrase "virtual appliance" refers to an example of a virtual machine that may include the application, operating system, and other items (e.g., data, drivers, and etc.) to enable simplification of the installation and the configuration process associated with running the application.

SUMMARY

The subject matter disclosed herein provides methods and apparatus, including computer program products, for sizing aspects associated with a virtual machine.

In one aspect, there is provided a computer-implemented method. The computer-implemented method includes receiving information representative of an extended application layer and a container, both of which operate at a virtual machine at a host. A determination is made regarding whether one or more aspects of the extended application and the container may be deinstalled. The extended application and the container are implemented without the deinstalled aspects.

The subject matter described herein may be implemented to realize the advantage of reducing the size of virtual machine implementations.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DETAILED DESCRIPTION

Figure 1:
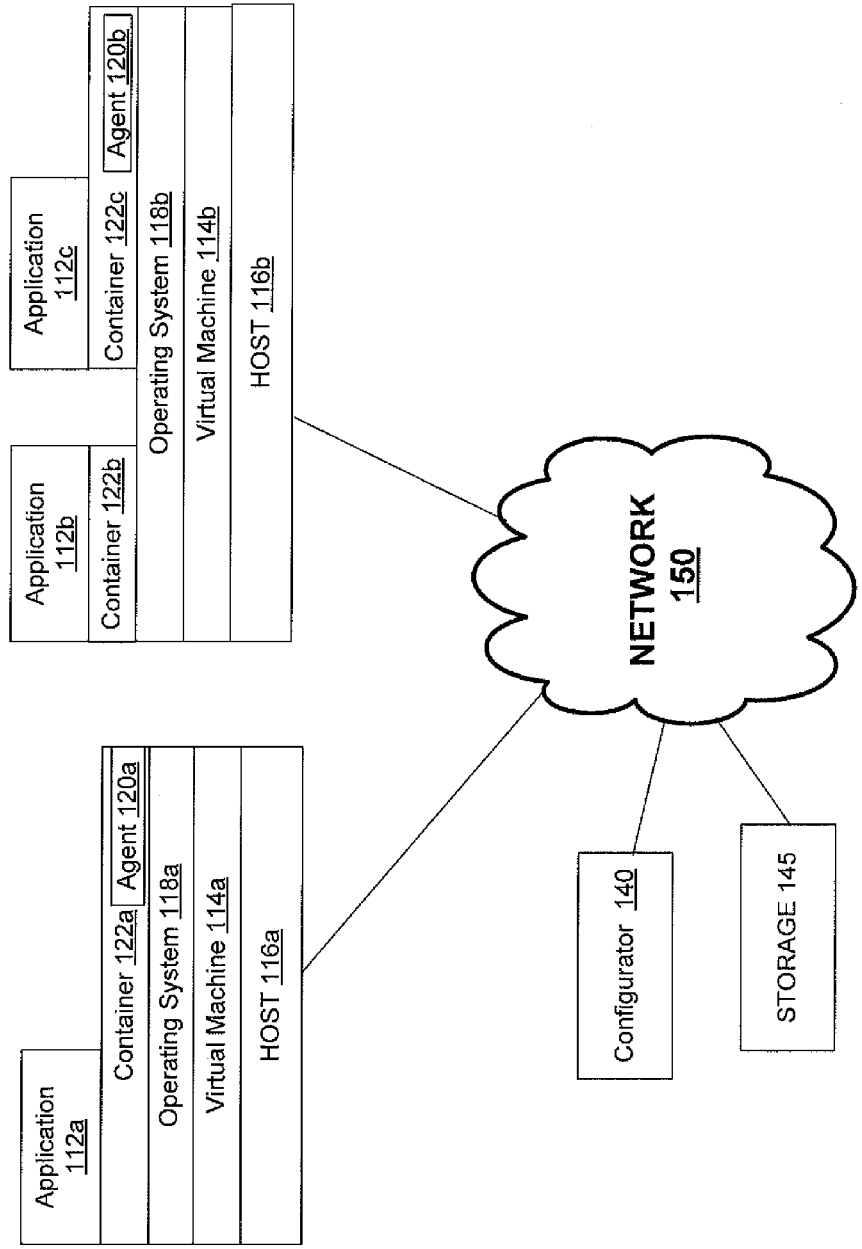
FIG. 1 depicts a block diagram of a system 100 including virtual machines.

Virtual machines are used to run applications in a flexible way. For example, virtual machines simplify adding resources, such as processing power, network capacity, memory capacity, and/or storage capacity, since such resources can be added virtually without necessarily requiring the addition of physical resources. Virtual machines also simplify moving applications from one physical machine to another or isolating applications from other applications. The uses of virtual machines will more than likely increase in the future.

To illustrate uses of virtual machines, virtual machines may be used in home banking to isolate applications. For example, most consumers fear that a computer virus may be used in an unwanted manner (e.g., to scan a password or illegally manipulate a banking transaction). A virtual machine may be used to minimize that risk by building a virtual machine that is isolated, i.e., used only for home banking. No other programs are installed or allowed to run on that virtual machine and no Internet browsing is done from this virtual machine save for browsing of the banking web site. In this configuration, the virtual machine provides an isolated home banking application that is less vulnerable to attack from, for example, a virus. In another example implementation, a virtual machine may be used in an Enterprise Service Oriented Architecture (ESOA). In such architecture, each service in the ESOA may run in its own virtual machine—providing isolation between different services and providing scalability of the services (e.g., varying virtual machine resources, such as processing power, memory, storage, bandwidth, and etc.). Although the above describes two example uses of virtual machines, other uses may be implemented as well.

Although virtual machines will increase in use, a possible impediment to their use is that virtual machines are installed with a full technology stack including a physical host, an operating system, a container, an application, services, and/or business processes. The services are typically applications with specific capabilities, such as security or remote usability, and business processes are a combination of services. The phrase "extended application layer" is used to refer to one or more of the following: an application, a service, and a business process. The use of a complete technology stack causes unnecessary overhead in terms of increased main memory consumption, increased disk storage, and so forth. The subject matter described herein relates to sizing the technology stack of an application operating in a virtual machine to reduce unnecessary aspects of that technology stack. In some implementations, the sizing is based entirely on the optimization of the applications (and higher levels like services and business processes) and the container infrastructure (e.g., a J2EE container, an ABAP container, a .NET container, and the like). In the case of complex, large enterprise software systems, there is much more to gain with respect to sizing the applications and the container infrastructure layer than merely sizing aspects of the operating system layer.

FIG. 1 depicts a system 100 including one or more hosts 116a-116b, a configurator 140, and storage 145, all of which may be coupled by a network 150 or any other communication mechanism including the Internet, intranet, inter-process communications, and the like.

Hosts 116a-b may be implemented as physical machines (e.g., processors, computers, servers, blades, and the like) capable of hosting one or more virtual machines 114a-b. The virtual machines 114a-b, implemented on hosts 116a-b, may be implemented as software for creating a virtualization layer between the host and the host's operating system. In some implementations, the virtual machines 114a-b may be implemented as a virtual appliance, which refers to a virtual machine that includes an application, an operating system and, in some cases, data to configure and/or operate the application. Moreover, the virtual machines 114a-b may each run an application 112a-c (e.g., a software program, an application program, a component of an application program, an applet, or the like). In some implementations, each of the applications 112a-c may have an operating system 118a-b, such as MICROSOFT WINDOWS, MICROSOFT VISTA, JAVA, SUN OS, LINUX, or any other operating system. The applications may also operate within containers 122a-c, such as a J2EE container, an ABAP container, a .NET container, or the like.

Agents 120a-b may be used to receive information representative of the container infrastructure or the extended applications layer installed on the host. The phrase container infrastructure refers to one or more containers, such as containers 122a-c. For example, agent 120a may be implemented to run in (e.g., as part of) the container infrastructure and receive information representative of the resources being used by application 112a while running in the container.

In some implementations, agent 120a may be incorporated into the container infrastructure or the extended application layer, although agent 120a may be implemented in other locations as well. In some implementations, agents 120a-b may be implemented as a web service. A service, such as a web service, is an application that may make itself available over the Internet or an intranet, may use standardized messaging, such as XML (eXtensible Markup Language) and Simple Object Access Protocol (SOAP), and may use some type of location mechanism, such as UDDI (Universal Description, Discovery, and Integration), to locate the service and its public Application Program Interface (API). In any case, agents 120a-b may receive information and then forward any received information to configurator 140, where the information is stored in storage 145.

The configurator 140 may receive information from one or more agents 120a-b, and store the received information in storage 145. Configurator 140 may receive such information from an agent over a predetermined period of time. Configurator 140 may determine, based on the received information, whether any aspects of a container infrastructure or the extended application layer may be disabled or deinstalled. For example, agents 120a may receive information representative of the interaction, such as communications, between application 112a and the container infrastructure. The received information may correspond to one or more of the following: the activation of application 112a inside the container infrastructure; the usage of application 112a; and any other aspect of the extended application layer that may enable configurator 140 to determine what aspects of the container infrastructure or the extended application layer may be deinstalled (e.g., removed or disabled).

Configurator 140 may, based on the received information, initiate the implementation of the container infrastructure or the extended application layer without one or more aspects of the container infrastructure or the extended application layer. For example, configurator 140 initiates the de-installation of certain parts of that are not used by application 112a.

Figure 2:
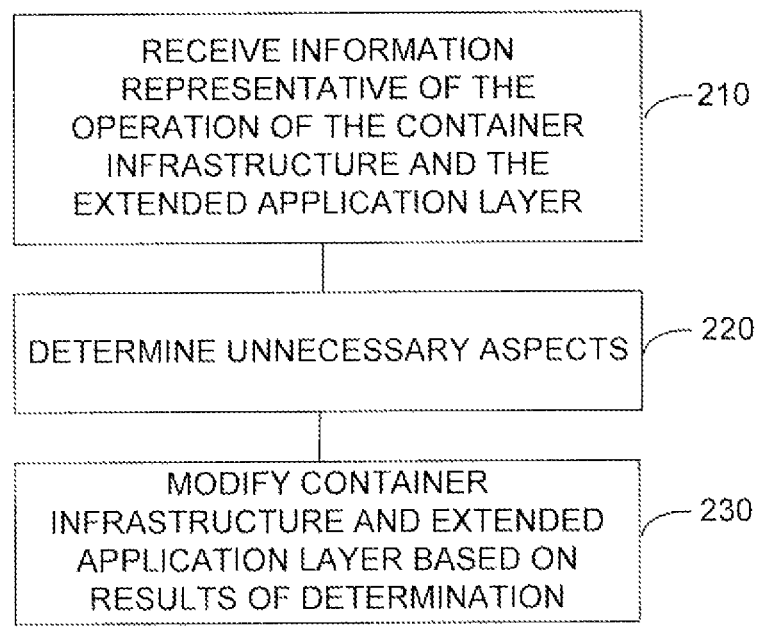
FIG. 2 depicts a process 200 for sizing.

FIG. 2 depicts a process 200 for sizing in a system implementing virtualization technology, such as virtual machines 114a-b.

At 210, an agent, such as agent 120a, may receive information representative of the operation of the extended application layer, such as application 112a, and the container infrastructure layer, such as container 122a. For example, agent 120a may monitor and receive communications between application 112a and container 122a. In some implementations, agent 120a passively monitors communications between application 112*a* and container 122*a*, and then receives a copy of only those messages that may be relevant to processing at 220. Agent 120*a* may provide the received information to configurator 140 though network 150, where that information is stored in storage 145.

At 220, configurator 140 uses the received information to determine what unnecessary aspects of the container infrastructure layer or the extended application layer may be deinstalled or disabled. Moreover, the received information may represent information gathered over a predetermined period of time. For example, the received information may correspond to messages sent between components of the extended applications, such as application 112*a*, and the container infrastructure, such as container 122*a* over a predetermined period of time, such as 1 minute, 1 hour, 1 day, 1 week, or any other period of time. If an aspect is not used during the period of time, that aspect of the extended application layer or container infrastructure may be identified for possible removal. In some cases, a set of predefined tests may be run to determine what aspects are unnecessary. When this is the case, time may not be a factor, so the predetermined period of time aspect is typically used only when there are no predefined tests.

To further illustrate, the received information stored in storage 145 may indicate that one or more of the following aspects may be removed as part of sizing: a software component, such as a business intelligence (BI) component or system, a search engine, a mobile engine support, and the like; one or more services in a container, such as the security service, the messaging service, the backup service, one or more log services, the monitoring service, the alerting service, and the like; in the case of ABAP, one or more work processes; in the case of Java, limiting the number and resource consumption of EJB (Enterprise Java Beans); certain modules/functions (e.g., encapsulated functionality within a computer program); database tables or other unused areas in a database; and main memory allocated by the extended application layer in the container infrastructure layer. As such, configurator 140 may determine which aspects may be deinstalled or disabled based on the received information.

At 230, configurator 140 may initiate the implementation (e.g., modification, re-installation, removal, and the like) of a container infrastructure and/or an extended application layer without the aspects identified in 220. In some implementations, configurator 140 may initiate the deinstallation of those aspects determined in 220. For example, configurator 140 may initiate deinstallation of those aspects determined in 220 or may initiate the reboot the container infrastructure and the extended application layer so that the aspects determined in 220 are not installed (e.g., disabled, removed, and the like). Returning to the above example, configurator 140 may initiate the de-installation (or reduction) of the following aspects of the container infrastructure and the extended application layer: a software component, such as a business intelligence (BI) component or system, a search engine, a mobile engine support, and the like; one or more services in a container, such as the security service, the messaging service, the backup service, one or more log services, the monitoring service, the alerting service, and the like; in the case of ABAP, one or more work processes; in the case of Java, limiting the number and resource consumption of EJB (Enterprise Java Beans); certain modules/functions (e.g., encapsulated functionality within a computer program); database tables or other unused areas in a database; and main memory allocated by the extended application layer in the container infrastructure layer.

Figure 3:
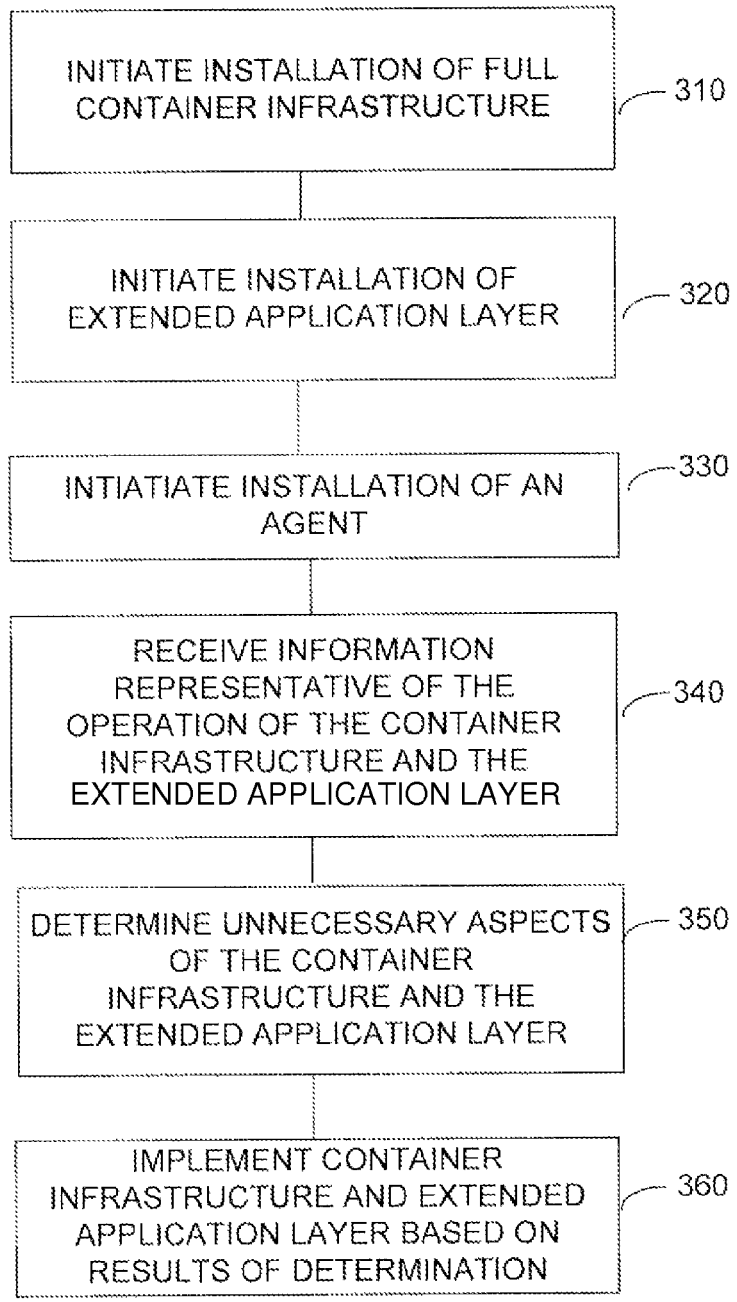
FIG. 3 depicts another process 300 for sizing.

FIG. 3 depicts another process 300 for sizing a container infrastructure or extended application layer in a system implementing virtualization technology, such as virtual machines 114*a-b*.

At 310-320, configurator 140 may initiate installation of a complete (i.e., full) container infrastructure and extended application layer at a virtual machine, such as virtual machines 114*a-b*. For example, configurator 140 may install or initiate another program to install the complete extended application layer as well as the container infrastructure.

At 330, configurator 140 initiates installation of agents 120*a-b*. Configurator 140 may install agents 120*a-b* as part of the container infrastructure (e.g. a service in a J2EE engine), as part of the extended application layer, or as part of any other aspect of system 100. In some implementations, agents 120*a-b* may be pre-installed (e.g., as a patch, upgrade, and the like) as part of the container infrastructure, the extended application layer, or a combination of both. In any case, configuration 140 may initiate installation by sending a message that initiates installation of an agent or activates a pre-installed agent.

At 340-360, configurator 140 may use a process similar to the one described above with respect to 210-230 at FIG. 2.

Figure 4:
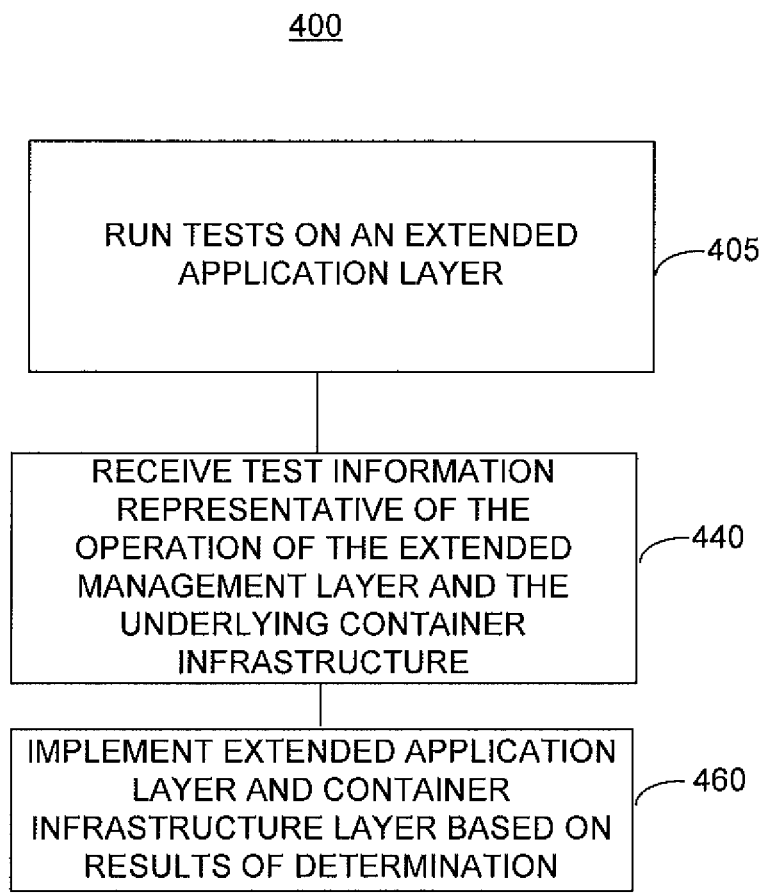
FIG. 4 depicts another process 400 for sizing.
Like labels are used to refer to same or similar items in the drawings.

FIG. 4 depicts another process 400 for sizing an extended application layer and the underlying container infrastructure layer in a system implementing virtualization technology, such as virtual machines 114*a-b*.

At 405, one or more tests are run on an extended application layer and/or a container.

In some implementations, the extended application layer and container infrastructure layer may be tested in a predetermined order. The predetermined order may test the extended application layer, container infrastructure layer, as well as other layers (e.g., operating systems) from smallest (in terms of, for example, size, number of components, and the like) to largest. Moreover, sets of preconfigured extended application layers and container infrastructure layers may be tested as well. To illustrate, if the smallest extended application layer and container infrastructure, such as the "absolute minimum" configuration passes unit testing (i.e., it works with the application at the virtual machine), that absolute minimum configuration is used; otherwise; the next container infrastructure (e.g., the "middle-weight") is tested and used if it passes testing; and so forth.

At 440, configurator 140 may receive the test information. The test information may represent operation of the extended application layer and the container infrastructure layer tested. For example, if testing determines that each of the container infrastructures operated properly (e.g., passed its tests) with the application layer, configurator 140 may then select the so-called "absolute minimum" container infrastructure since this represents the minimum that works properly with the application.

At 460, configurator 140 may initiate implementation (e.g., modify, install, re-install, and the like) of the extended application layer and the container infrastructure based on the results of 450, as described above with respect to 360.

Although FIG. 1 depicts system 100, other configurations of the components of system 100 may be implemented as well. For example, any number of hosts, virtual machines, agents, and applications may be implemented. Moreover, although FIG. 1 depicts a single virtual machine on each host, a plurality of virtual machines may be implemented on each host. Moreover, in some implementations, configurator 140 is incorporated into virtualization software, such as software used to manage one or more virtual machines.

Although the above example describes receiving information regarding the container and extended applications layer, other information, such as operating system information, may be received as well, and aspects of the operating system may be sized in accordance with the mechanisms described herein. Moreover, the term user refers to any entity including another processor, such as a host computer.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A non-transitory computer-readable medium containing instructions to configure a processor to perform a method, the method comprising:
   receiving information representative of at least one of an extended application layer and a container infrastructure layer, the extended application layer and the container infrastructure layer operating at a virtual appliance at a host, wherein the extended application layer and the container infrastructure layer comprise at least one of an application, a service, and a process, and wherein the information is received from an agent operatively connected to the extended application layer and the container infrastructure layer;
   determining, based on the received information, whether the at least one of the application, the service, and the process is to be deinstalled or disabled by testing at the virtual appliance preconfigured sets of extended application layers and container infrastructure layers, the testing of preconfigured sets performed in order from a smallest preconfigured set having a smallest number of components to a largest preconfigured set having a lamest number of components; and
   implementing the at least one of the extended application layer and the container infrastructure layer based on the results of the determining.

2. The computer-readable medium of claim 1, wherein receiving further comprises:
   receiving information using the agent for monitoring messages sent to or from the extended application layer and the container infrastructure layer.

3. The computer-readable medium of claim 2 further comprising:
   providing the received information to a configurator for determining, based on the received information, whether one or more of the application, the service, and the process are to be deinstalled or disabled.

4. The computer-readable medium of claim 1 further comprising:
   initiating installation of the container infrastructure at the virtual appliance;
   initiating installation of the extended application layer at the virtual appliance; and
   initiating installation of the agent, the agent installed as part of at least one of the extended application layer or the container infrastructure layer, the agent monitoring messages to or from at least one of the extended application layer or the container infrastructure layer.

5. The computer-readable medium of claim 1 further comprising:
   implementing at least one of the preconfigured sets based on the testing.

6. A computer-implemented method comprising:
   receiving information representative of at least one of an extended application layer and a container infrastructure layer, the extended application layer and the container infrastructure layer operating at a virtual appliance at a host, wherein the extended application layer and the container infrastructure layer comprise at least one of an application, a service, and a process, and wherein the information is received from an agent operatively connected to the extended application layer and the container infrastructure layer;
   determining, based on the received information, whether the at least one of the application, the service, and the process is to be deinstalled or disabled by testing at the virtual appliance preconfigured sets of extended application layers and container infrastructure layers, the testing of preconfigured sets performed in order from a smallest preconfigured set having a smallest number of components to a largest preconfigured set having a lamest number of components; and
   implementing the at least one of the extended application layer and the container infrastructure layer based on the results of the determining.

7. The computer-implemented method of claim 6, wherein receiving further comprises:
   receiving information using the agent for monitoring messages sent to or from the extended application layer and the container infrastructure layer.

8. The computer-implemented method of claim 7 further comprising:
   providing the received information to a configurator for determining, based on the received information, whether one or more of the application, the service, and the process are to be deinstalled or disabled.

9. The computer-implemented method of claim 6 further comprising:
 initiating installation of the container infrastructure at the virtual appliance;
 initiating installation of the extended application layer at the virtual appliance; and
 initiating installation of the agent, the agent installed as part of at least one of the extended application layer or the container infrastructure layer, the agent monitoring messages to or from at least one of the extended application layer or the container infrastructure layer.

10. The computer-implemented method of claim 6 further comprising:
 implementing at least one of the preconfigured sets based on the testing.

11. A system comprising:
 at least one physical processor; and
 at least one physical memory, wherein the processor and the memory are configured to perform a method comprising:
 receiving information representative of at least one of an extended application layer and a container infrastructure layer, the extended application layer and the container infrastructure layer operating at a virtual appliance at a host, wherein the extended application layer and the container infrastructure layer comprise at least one of an application, a service, and a process, and wherein the information is received from an agent operatively connected to the extended application layer and the container infrastructure layer;
 determining, based on the received information, whether the at least one of the application, the service, and the process is to be deinstalled or disabled by testing at the virtual appliance preconfigured sets of extended application layers and container infrastructure layers, the testing of preconfigured sets performed in order from a smallest preconfigured set having a smallest number of components to a largest preconfigured set having a lamest number of components; and
 implementing the at least one of the extended application layer and the container infrastructure layer based on the results of the determining.

* * * * *

UNITED STATES PATENT AND TRADEMARK OFFICE
CERTIFICATE OF CORRECTION

PATENT NO. : 8,683,459 B2  
APPLICATION NO. : 12/037875  
DATED : March 25, 2014  
INVENTOR(S) : Gebhart et al.

Page 1 of 1

It is certified that error appears in the above-identified patent and that said Letters Patent is hereby corrected as shown below:

In the Claims:

Column 8, lines 2-3, claim 1 the word "lamest" should read --largest--.

Column 8, lines 52-53, claim 6 the word "lamest" should read --largest--.

Column 10, lines 16-17, claim 11 the word "lamest" should read --largest--.

Signed and Sealed this  
Twenty-fourth Day of June, 2014

Michelle K. Lee  
*Deputy Director of the United States Patent and Trademark Office*